Nov. 3, 1964  E. STUMP ETAL  3,155,397
DOUBLE AXLE SUSPENSION AND STEERING ARRANGEMENT
Filed Feb. 12, 1962  4 Sheets-Sheet 1

FIG. 1

INVENTORS.
EUGEN STUMP
PAUL E. STRIFLER
BY  Dicke and Craig
ATTORNEYS.

Nov. 3, 1964  E. STUMP ETAL  3,155,397
DOUBLE AXLE SUSPENSION AND STEERING ARRANGEMENT
Filed Feb. 12, 1962  4 Sheets-Sheet 2

INVENTORS
EUGEN STUMP
BY PAUL E. STRIFLER
Dicke & Craig
ATTORNEYS

Nov. 3, 1964  E. STUMP ETAL  3,155,397
DOUBLE AXLE SUSPENSION AND STEERING ARRANGEMENT
Filed Feb. 12, 1962  4 Sheets-Sheet 3

FIG. 4

INVENTORS.
EUGEN STUMP
PAUL E. STRIFLER
BY
Dicke and Craig
ATTORNEYS.

Nov. 3, 1964  E. STUMP ETAL  3,155,397

DOUBLE AXLE SUSPENSION AND STEERING ARRANGEMENT

Filed Feb. 12, 1962  4 Sheets-Sheet 4

INVENTORS.
EUGEN STUMP
PAUL E. STRIFLER
BY
Dicke and Craig
ATTORNEYS.

United States Patent Office
3,155,397
Patented Nov. 3, 1964

3,155,397
DOUBLE AXLE SUSPENSION AND STEERING
ARRANGEMENT
Eugen Stump, Stuttgart-Unterturkheim, and Paul E.
Strifler, Kornwestheim, Germany, assignors to Daimler-
Benz Aktiengesellschaft, Stuttgart - Unterturkheim,
Germany
Filed Feb. 12, 1962, Ser. No. 172,447
23 Claims. (Cl. 280—81.5)

The present invention relates to a so-called curve-following or curve-tracknig double axle, especially to a double rear axle for motor vehicles, whereby the two axles are guided in an oppositely directed manner with respect to each other by means of mutually inclined guide members that are actuated automatically and/or selectively when driving through a curve.

Double axles of the aforementioned type are known, per se, in the prior art. With the known double axle constructions, leaf springs are normally used for the oppositely directed guidance thereof. This prior art arrangement, however, is disadvantageous by reason of the relative movement occurring between the axles and the leaf springs. Additionally, these arrangements are limited to a vehicle provided with leaf springs and cannot be applied as such, at least not without major modifications, to other spring elements.

The present invention seeks to eliminate the aforementioned disadvantages and solves the problem by providing, in connection with the aforementioned double axles, a double-armed lever for the oppositely directed guidance of the two axles and by pivotally supporting the double-armed lever approximately in the center thereof at the vehicle frame or superstructure, and additionally by pivotally connecting at each end of this double-armed lever the pair of longitudinal guide members of a respective axle.

According to a further development and additional feature of the present invention, the double-lever, in its turn, may be rigidly connected with the vehicle steering system in such a manner that upon actuation of the steering system there takes place simultaneously a forcible or positive steering of the double axle.

The present invention is applicable in an advantageous manner to vehicles with other spring systems, for example, with pneumatic spring systems and makes it possible to equip these vehicles in a simple manner with a curve-following or curve-tracking double axle. Furthermore, any frictional relative movement between the guide members and leaf springs that may be expected with the prior art systems is thereby also completely eliminated with the system in accordance with the present invention.

It is conventional to guide the axles by means of transverse guide members. According to the present invention, these transverse guide members are arranged within or approximately within the same transverse plane as the spring elements constructed preferably as pneumatic springs. It is thereby also appropriate in accordance with the present invention with a double axle having a positive steering to arrange the transverse guide members within or nearly within the same transverse plane as the axles themselves.

According to a further feature of the present invention, the double lever and/or an axle may be connected, for purposes of stabilization in the center position thereof, with the vehicle superstructure such as the frame of supporting body portions of a self-supporting type body construction, by means of a pretensioned or prestressed spring element. For the purpose of the rigid fixation in the center position serves a separate fixing element which is secured at the double lever or an axle or at a guide member and which is adapted to be rendered immovable relative to the vehicle superstructure. The pre-stressed spring element may thereby simultaneously also serve for the immobilization or fixation and may be constructed for that purpose in the manner of a hydraulic cylinder provided with a pressure piston.

This further feature of the present invention results in a good guidance of the double axle during straight drives because a continuous swinging of the axle is prevented by the pre-stresses spring element below the occurrence of a minimum transverse force. During reverse drive or with unfavorable road conditions the axle may be fixed in the center position thereof by the separate fixing element and this immobilization or fixation may also be so arranged and constructed as to be variable or adjustable. The fixation is used only with the double axle according to the present invention without the positive steering of the double axle.

Accordingly, it is an object of the present invention to provide a simple double axle suspension, especially for motor vehicles, which effectively avoids the shortcomings of the prior art and which, in particular, is not limited in its use to spring-suspensions utilizing leaf springs.

Another object of the present invention resides in the provision of a double axle suspension, especially for motor vehicles, in which the two axles are guided in an oppositely directed manner with respect to each other and which also permits a positive steering of the double axle upon actuation of the steering of the motor vehicle.

Still a further object of the present invention resides in the provision of a double axle suspension which is applicable also to other types of spring systems, such as pneumatic spring systems and which avoids any relative frictional movements between guide members and leaf springs as is normally encountered in the prior art constructions.

A further object of the present invention resides in the provision of a double axle suspension for motor vehicles in which a fixation may be provided by simple means to prevent a constant swinging or deflection of the axles in the absence of a minimum transverse force.

These and other objects, features and advantages of the present invention will become more obvious from the following description when taken in connection with the accompanying drawing which shows, for purposes of illustration only, several embodiments in accordance with the present invention, and wherein.

Figure 1:
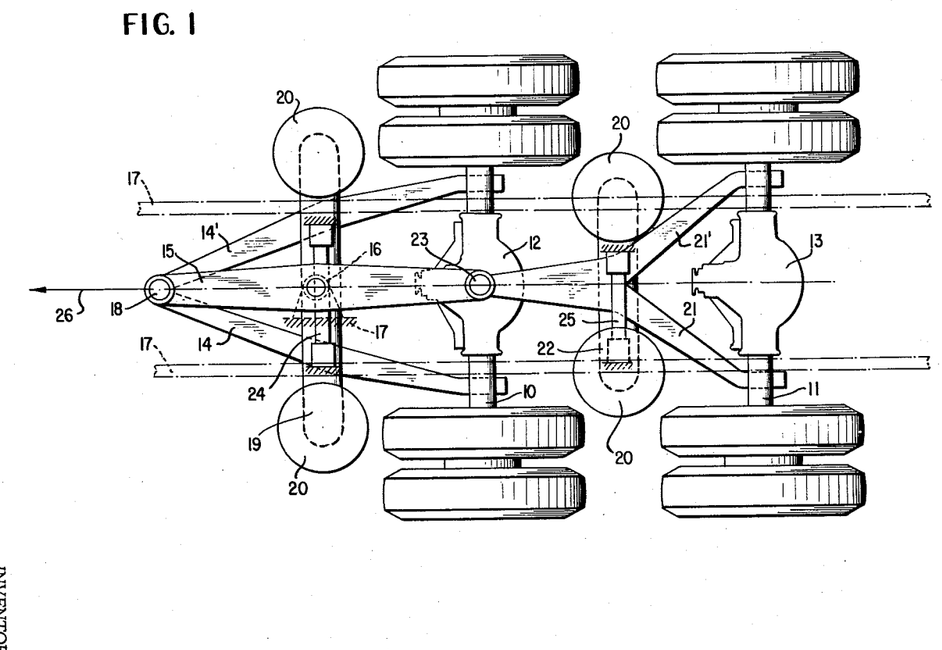
FIGURE 1 is a schematic plan view of a double axle suspension in accordance with the present invention without positive steering.
Figure 2:
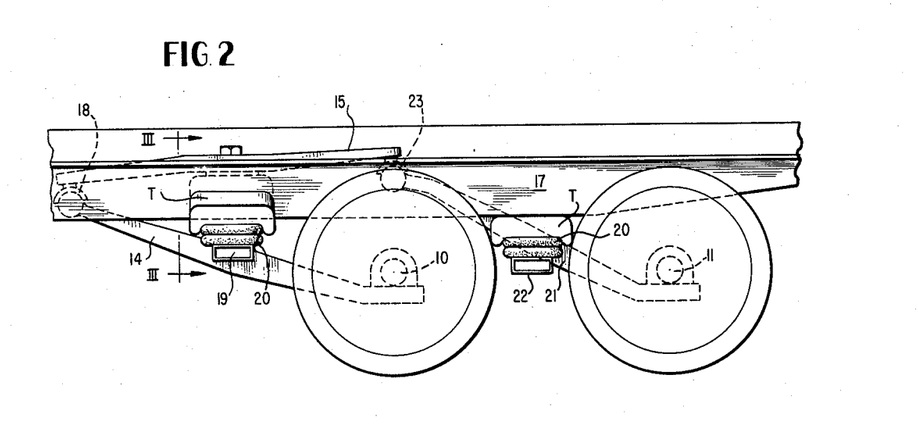
FIGURE 2 is a schematic side view of the double axle

Referring now to the drawing wherein like reference numerals are used throughout the various views to designate corresponding parts, and more particularly to Figures 1 and 2, the double axle of a truck-type vehicle shown therein consists of the forward axle 10 and of the rearward axle 11 which are both driven by means of differentials 12 and 13. Of course, it is understood that the present invention is not limited to driven axles but may also be used with non-driven axles or with a double axle construction of which only one axle is driven.

The forward axle 10 is pivotally supported at the forward end of a double lever 15 by a pair of longitudinal guide members 14 and 14' which are angularly bent in the outward direction. The double lever 15 is rotatably supported approximately in the center thereof at the vehicle superstructure such as the frame or body of a self-supporting type body construction by means of a joint 16 of any conventional construction. The pair of guide members 14 and 14' effectively forms as a whole a triangular guide system and engages at the double lever 15 in a joint 18. The pair of guide members 14 and 14' is provided approximately in the center between the axle 10 and the joint 18 and substantially at the places of the angular bends thereof with a cross bearer member 19 to which each guide member is operatively connected and which, in turn, is supported by means of pneumatic spring elements 20 of any known appropriate construction or by means of other spring elements at the vehicle superstructure 17 or, as also shown in FIGURE 3, at a cross traverse T which is in turn connected to the superstructure 17.

A pair of longitudinal guide members 21 and 21' also extends rearwardly from the rearward axle 11. In contrast to the pair of longitudinal guide members 14 and 14' of the forward axle 10, the pair of rearward axle guide members 21 and 21' is angularly bent in the inward direction so that it forms a triangular guide system up to the transverse bearer member 22. The transverse bearer member 22, in turn, is supported by suitable spring elements 20 which may be similar to or different from the springs associated with bearer member 19 at the vehicle superstructure or at a traverse T similar to that shown in FIGURE 3. Both guide members 21 and 21' are fixed to and extend from the cross bearer member 22 together centrally in the forward direction up to the joint 23 located at the rear end of the double lever 15.

Figure 3:
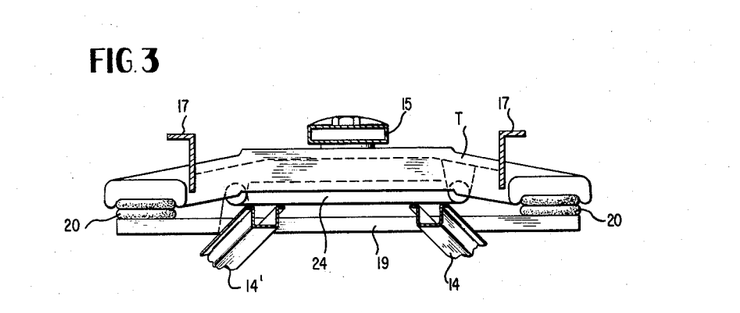
FIGURE 3 is a transverse sectional view taken along line II—II of FIGURE 2.

The transverse forces are absorbed in the axle construction illustrated in FIGURE 1 by suitable transverse guide members 24 and 25 of conventional construction which are arranged within the plane of the spring elements 20 or in proximity thereto as shown in FIGURE 3. The transverse guide members 24 and 25 are pivotally connected, for example, by ball and socket joints with one end thereof at the transverse bearer members 19 and 22, respectively, and with the other ends thereof at a part of the vehicle superstructure, for example, at a longitudinal frame bearer member or at a cross traverse T such as shown in FIGURE 3. Some or all the pivotal connecting points of the longitudinal and/or transverse bearer members may be provided, in a manner known per se, with elastic bearing bushings, for example; made of rubber or equivalent material.

When driving through a curve, both axles 10 and 11 are guided in opposite directions with respect to each other by the double lever 15. For example, if in a right-hand curve, the driving direction being taken in the direction of arrow 26, the double lever 15 rotates in the clockwise direction, then the forward axle 10 is rotated also in the clockwise direction under corresponding lateral movement whereas the rearward axle 11 is rotated under correspondingly oppositely directed lateral movement in the counterclockwise direction.

Figure 4:
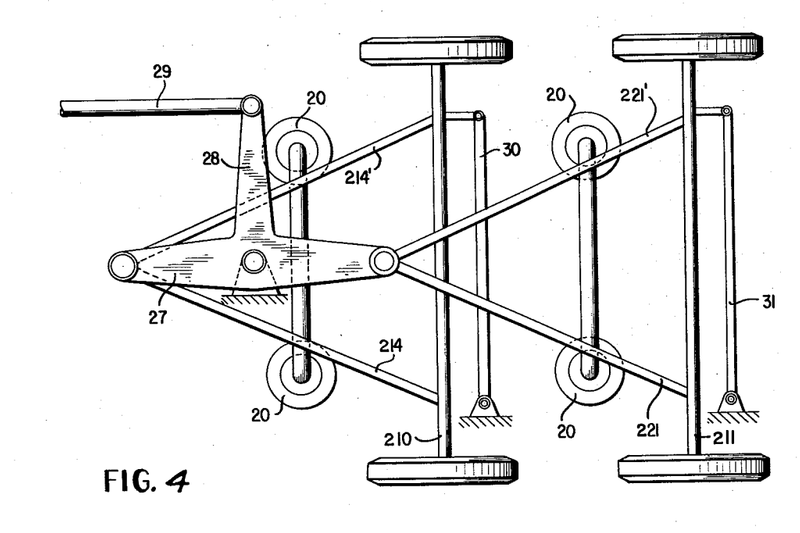
FIGURE 4 is a schematic plan view of a modified embodiment of a double axle suspension with positive steering in accordance with the present invention.

In the embodiment of FIGURE 4, the double axle itself is constructed according to the same principles as FIGURES 1, 2 and 3. However, a third arm 28 or the like is rigidly connected laterally at the double lever 27. The third arm 28 is operatively connected by a suitable connecting means, for example, by a connecting rod 29 with the steering system of the vehicle (not shown), for example, with the steering lever thereof. The transverse guide members 30 and 31 are thereby displaced into or nearly into the transverse planes of the axles 210 and 211 themselves. By such an arrangement is achieved that the steering forces do not become excessive during standstill or during slow travel of the vehicle.

Upon actuation of the vehicle steering system, the double lever 27 is positively or forcibly rotated in this embodiment by means of the connecting rod 29. As a result thereof, there is achieved the corresponding oppositely directed angular displacement of both axles 210 and 211 in a positive manner and in dependence on the steering deflection. Both axles are thereby deflected hardly at all in the lateral direction but practically are only swung or pivoted.

Figure 5:
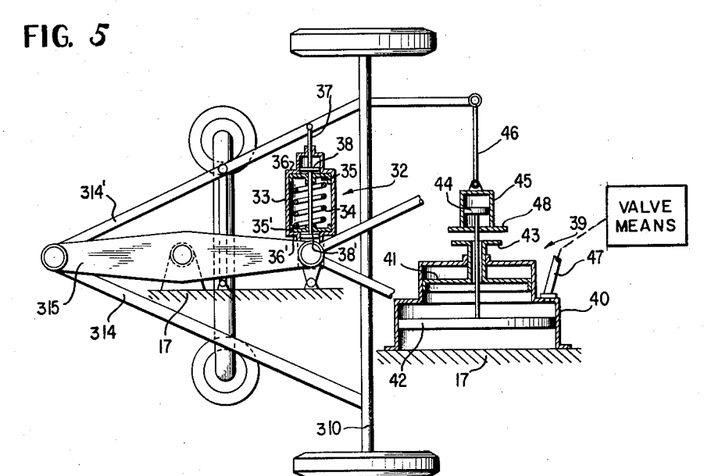
FIGURE 5 is a schematic plan view, partially in cross section, of still a further modified embodiment of a double axle suspension provided with guide and fixation means.

FIGURE 5 shows the forward axle 310 of an embodiment similar in principle to that of FIGURE 1. However, in the embodiment of FIGURE 5, a spring element generally designated by reference numeral 32 is pivotally secured at the guide member 314 or 314' which spring element 32, in turn, is rigidly connected with the vehicle superstructure 17. The spring element 32 serves for stabilizing the double axle in the center position thereof and, of course, may also be arranged at the double lever 15 or at the guide member of the other axle (not shown) or at an axle itself.

The spring element 32 consists of a cylinder 33 which is offset at both ends thereof to form cylinder portions of reduced diameter. Within the center part of the cylinder 33 are disposed one or several pre-stressed coil springs 34 which are supported at both ends at spring disks 35 and 35'. The spring disks 35 and 35', in turn, abut against the off-set portions 36 and 36' of the cylinder 33. A connecting rod 37 extends through both the cylinder 33 and the coil spring 34 and is rigidly connected on each side outside of the spring disk 35 and 35' with a respective plate-shaped entrainment member 38 and 38' or the like so that members 38 and 38' move in unison with connecting rod 37.

A predetermined resistance is opposed to the deflection of the axle by the pretension of the spring 34, that is, a transverse force of a predetermined magnitude corresponding to a predetermined minimum curve radius is required in order to deflect the axle from the center position thereof. If this pretension is exceeded, then the connecting rod 37, depending on the direction of deflection, takes along by means of one of the two entrainment members 38 or 38' thereof one of the spring disks 35 or 35' and thereby compresses the spring 34. A fixation or immobilization element generally designated by reference numeral 39 is coordinated to the axle 310 or to the other axle or to the double lever 315 for the purpose of fixation or immobilization in the center position thereof. The fixation or immobilization element 39 is constructed as pressure-medium cylinder 40 which is secured at the vehicle superstructure 17. Two oppositely moving pistons 41 and 42 of different diameters are disposed within the pressure medium cylinder 40 constructed as a double-step or two-stage element. The piston 41 is connected with a flange 43 and the piston 42 with an abutment disk 44. The abutment disk 44 engages in a pot-shaped housing 45 which is pivotally connected by a connecting rod 46 with the axle 10.

If a pressure medium, for example, compressed air is introduced into the cylinder 40 through the line 47 and both pistons 41 and 42 are thereby pressed apart, then the pot-shaped housing 45 with its flange 48 is clamped between the flange 43 and the abutment 44. The axle 310 is thereby fixed in the transverse direction—as the force on piston 42 is larger—so that a steering can no longer take place.

Figure 6:
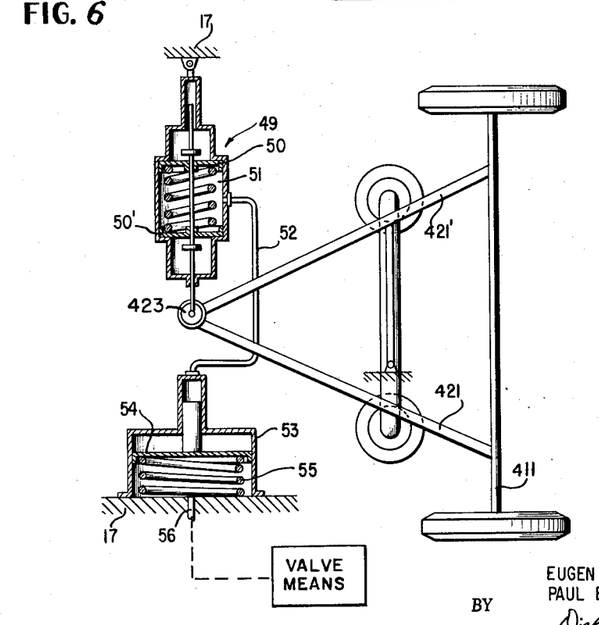
FIGURE 6 is a partial schematic plan view, partially in cross section, of still another modified embodiment of a double axle suspension in accordance with the present invention similar in principle to the arrangement of Figure 5.

A similar arrangement is illustrated in the embodiment of FIGURE 6 which illustrates such a system at the rearward axle. The pre-stressed spring element generally designated by reference numeral 49 which engages at the pivotal connecting point 423 of the rearward axle 411 thereby serves simultaneously as fixation or immobilization element. For that purpose, the spring disks 35 and 35' described in connection with the embodiment of FIGURE 5 are constructed in the embodiment of FIGURE 6 as hydraulically seal-type pistons 50, 50'. A cylinder 53 rigidly connected at the vehicle superstructure is operatively connected or in communication with the center space 51 of the fixation element 49 filled with the pressure medium by means of a line or conduit 52. A piston 54 is arranged within the cylinder 53 which piston 54 is kept under pre-stress by a spring 55. The piston can be loaded with compressed air through a line 56, for instance, leading to the compressed air tank of the power brake assembly. Suitable control means of appropriate conventional construction, for example, manually and/or automatically actuatable valves may be included in line 56.

During normal drive, the piston 54 is pre-stressed exclusively by the spring 55. The axle arrangement can therefore operate in the normal curve-following or curve tracking manner, that is against the pre-stress of the spring in spring element 49 as well as of the spring 55. Under certain circumstances, no spring at all needs to be arranged within element 49 but the latter can be constructed as a purely hydraulic cylinder. If the piston 54 is additionally loaded with compressed air admitted selectively through the line 56 by means of appropriate selectively and/or automatically actuated controls of conventional construction, then no pressure medium whatsoever can escape any longer form the center space 51 of the spring element 49 into the cylinder 53. The tension of the spring in the spring element 49 and of the spring 55 is thereby effectively reinforced to such an extent that a deflection of the axle out of the center position thereof is no longer possible.

The term superstructure is used herein to refer generically to a relatively fixed part of the vehicle constituted, for example, by the frame parts or by body portions of a self-supporting type body construction.

While we have shown and described several embodiments in accordance with the present invention, it is understood that the same is not limited thereto, but is susceptible of many changes and modifications within the spirit and scope thereof, and we therefore do not wish to be limited to the details shown and described herein, but intend to cover all such changes and modifications as are encompassed by the scope of the appended claims.

We claim:

1. A curve-following double axle, especially double rear axle for motor vehicles provided with a vehicle superstructure comprising first axle means, second axle means, and guide means for guiding said first and second axle means in opposite directions with respect to each other, said guide means including a pair of guide members attached to each axle means and having a free end, said guide members being mutually inclined with respect to each other, an essentially horizontally arranged double-armed lever means extending essentially longitudinally of the vehicle, said pairs of guide members extending forwardly of the respective axle means guided thereby, means operatively connecting a respective end of said double-armed lever means to said free end of a respective pair of said guide members and therethrough to the corresponding axle means guided thereby, and means rotatably supporting said double-armed lever means approximately in the center thereof at the vehicle superstructure.

2. A curve-following double axle especially double rear axle for motor vehicles provided with a vehicle superstructure and with steering means comprising first axle means, second axle means, and guide means for guiding said first and second axle means in opposite directions with respect to each other, said guide means including a pair of guide members attached to each axle means, an essentially horizontally arranged double armed lever means extending longitudinally of the vehicle and having a free end, said pairs of guide members extending forwardly of the respective axle means guided thereby, means operatively connecting a respective end of said double-armed lever means to said free end of a respective pair of said guide members and therethrough to the corresponding axle means guided thereby, means rotatably supporting said double-armed lever means approximately in the center thereof at the vehicle superstructure, and means operatively connecting said double-armed lever means with said steering means for positively actuating said double-armed lever means upon actuation of said steering means.

3. A curve-following double axle especially double rear axle for motor vehicles provided with a vehicle superstructure and with steering means comprising first axle means, second axle means, and guide means for guiding said first and second axle means in opposite directions with respect to each other, said guide means including a pair of guide members attached to each axle means and each having a free end, an essentially horizontally arranged double-armed lever means extending longitudinally of the vehicle, said pairs of guide members extending forwardly of the respective axle means guided thereby, said double-armed lever means being provided with a further lever arm, means operatively connecting a respective end of said double-armed lever means to a respective pair of said guide members and therethrough to the corresponding free end of a respective pair of said guide members, means rotatably supporting said double-armed lever means approximately in the center thereof at the vehicle superstructure, and link means operatively connecting the further lever arm of said double-armed lever means with said steering means for positively actuating said double-armed lever means upon actuation of said steering means.

4. A curve-following double axle especially double rear axle for motor vehicles provided with a vehicle superstructure and with steering means comprising first axle means, second axle means, and guide means for guiding said first and second axle means in opposite directions with respect to each other, said guide means including a pair of guide members for each axle means and transverse guide means for said axle means, an essentially horizontally arranged double-armed lever means extending longitudinally of the vehicle, said pairs of guide members extending forwardly of the respective axle means guided thereby, said double-armed lever means being provided with a further lever arm, means operatively connecting a respective end of said double-armed lever means to a respective pair of said guide members and therethrough to the corresponding axle means guided thereby, means rotatably supporting said double-armed lever means approximately in the center thereof at the vehicle superstructure, spring means for spring supporting said axle means at the vehicle superstructure, and link means operatively connecting the further lever arm of said double-armed lever means with said steering means for positively actuating said double-armed lever means upon actuation of said steering means, said transverse guide means being arranged at least nearly within the same transverse plane as the respective spring means.

5. A curve-following double axle especially double rear axle for motor vehicles provided with a vehicle superstructure and with steering means comprising first axle means, second axle means, and guide means for guiding said first and second axle means in opposite directions with respect to each other, said guide means including a pair of guide members for each axle means and transverse guide means for said axle means, an essentially horizontally arranged double-armed lever means extending longitudinally of the vehicle, said pairs of guide members extending forwardly of the respective axle means guided thereby, said double-armed lever means being provided with a further lever arm, means operatively connecting a respective end of said double-armed lever means to a respective pair of said guide members and therethrough to the corresponding axle means guided thereby, means rotatably supporting said double-armed lever means approximately in the center thereof at the vehicle superstructure, spring means for spring supporting said axle means at the vehicle superstructure, and link means operatively connecting the further lever arm of said double-armed lever means with said steering means for positively actuating said double-armed lever means upon actuation of said steering means, said transverse guide means being arranged at least nearly within the same transverse plane as the respective spring means and at least nearly within the same transverse plane as the respective axle means.

6. A curve-following double axle especially double rear axle for motor vehicles provided with a vehicle superstructure and with steering means having a steering lever comprising first axle means, second axle means, and guide means for guiding said first and second axle means in opposite directions with respect to each other, said guide means including a pair of guide members for each axle means and transverse guide means for said axle means, an essentially horizontally arranged double-armed lever means extending longitudinally of the vehicle, said pairs of guide members extending forwardly of the respective axle means guided thereby, said double-armed lever means being provided with a further lever arm extending laterally therefrom, means operatively connecting a respective end of said double-armed lever means to a respective pair of said guide members and therethrough to the corresponding axle means guided thereby, means rotatably supporting said double-armed lever means approximately in the center thereof at the vehicle superstructure, spring means including pneumatic spring elements for spring supporting said axle means at the vehicle superstructure, and link means operatively connecting the further lever arm of said double-armed lever means with the steering lever of said steering means for positively actuating said double-armed lever means upon actuation of said steering means, said transverse guide means being arranged at least nearly within the same transverse plane as the respective spring means and at least nearly within the same transverse plane as the respective axle means.

7. A curve-following double axle, especially double rear axle for motor vehicles provided with a vehicle superstructure, comprising first axle means, second axle means, and guide means for guiding said first and second axle means in opposite directions with respect to each other including a pair of guide members for each axle means, an essentially horizontally arranged, double-armed lever means extending longitudinally of the vehicle, said pairs of guide members extending forwardly of the respective axle means guided thereby, pivotal means operatively connecting a respective end of said double-armed lever means to a respective pair of said guide members and therethrough to the corresponding axle means guided thereby, and means rotatably supporting said double-armed lever means approximately in the center thereof at the vehicle superstructure, the pair of guide members of one of said axle means forming effectively a triangular guide system engaging one end of said double-armed lever means at the apex thereof, said triangular guide system including a transverse bearer member disposed approximately in the center between the corresponding axle means and the pivotal connection of the guide system at said double-armed lever means, and pneumatic spring means for spring-supporting said transverse bearer at said vehicle superstructure.

8. A curve-following double axle, especially double rear axle for motor vehicles provided with a vehicle superstructure, comprising first axle means, second axle means, and guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, pivotal means operatively connecting a respective end of said double-armed lever means to a respective pair of said guide members and therethrough to the corresponding axle means guided thereby, and means rotatably supporting said double-armed lever means approximately in the center thereof at the vehicle superstructure, the pair of guide members of the forward one of said axle means forming effectively a triangular guide system engaging the forward end of said double-armed lever means at the apex thereof, said triangular guide system including a transverse bearer member disposed approximately in the center between the corresponding axle means and the pivotal connection of the guide system at said double-armed lever means, and pneumatic spring means for spring-supporting said transverse bearer at said vehicle superstructure, the pair of guide members for the other rearward axle means including a further transverse bearer member disposed approximately in the center between the corresponding axle means and the pivotal connection of said last-mentioned pair of guide members, and pneumatic spring means for spring supporting said further transverse bearer member at said vehicle superstructure, said last-mentioned pair of guide members effectively forming, from the respective axle means up to said further transverse bearer member, a triangular guide system which is extended centrally from said further transverse bearer member up to the last-mentioned pivotal connection at said double-armed lever means.

9. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including prestressed spring means operatively connecting one of the elements of the double axle construction consisting of said axle means, said guide means and said double-armed lever means with said superstructure, and fixation means operatively connected with said prestressed spring means for substantially immobilizing the latter in said center position.

10. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged, double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including prestressed spring means operatively connecting one of the elements of the double axle construction consisting of said axle means, said guide means and said double-armed lever means with said superstructure, and fixation means operatively connected with said prestressed spring means for substantially immobilizing the latter in said center position, said prestressed spring means including a cylinder operatively connected with one of the two parts consisting of said superstructure and of one of the said elements of the axle construction, said cylinder being provided with cylinder portions of reduced diameter at both ends thereof, a coil spring within said cylinder supported under prestress against the off-sets formed in said cylinder by means of spring disks, a connecting rod extending through said coil spring and said spring disks and provided with entrainment members on both sides thereof outside of said spring disks, said connecting rod being operatively connected with the other of said two parts.

11. A curve-following double axle construction according to claim 10, wherein said one part is the vehicle superstructure and the other part is a guide member of the pair associated with one of said axle means.

12. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including prestressed spring means operatively connecting one of the elements of the double axle construction consisting of said axle means, said guide means and said double-armed lever means with said superstructure, and fixation means operatively connected with said prestressed spring means for substantially immobilizing the latter in said center position, said fixation means including a cylinder for a pressure-medium and operatively connected with one of the two parts consisting of the vehicle superstructure and one of the said elements of the axle construction, two oppositely acting pistons disposed within said pressure-medium cylinder and provided each with a piston rod having clamping means, abutment means operatively connected with the other of said two last-mentioned parts and adapted to be fixed with said two pistons in the spread-apart positions thereof between said two clamping means.

13. A curve-following double axle construction according to claim 12, wherein said one part is the vehicle superstructure and the said other part is one of said axle means.

14. A curve-following double axle construction, especially double rear axle for motor vehiclces having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including prestressed spring means operatively connecting one of the elements of the double axle construction consisting of said axle means, said guide means and said double-armed lever means with said superstructure, and fixation means operatively connected with said prestressed spring means for substantially immobilizing the the latter in said center position, said prestressed spring means including a cylinder operatively connected with one of the two parts consisting of said superstructure and of one of the said elements of the axle construction, said cylinder being provided with cylinder portions of reduced diameter at both ends thereof, a coil spring within said cylinder supported under prestress against the off-sets formed in said cylinder by means of spring disks, a connecting rod extending through said coil spring and said spring disks and provided with entrainment members on both sides thereof outside of said spring disks, said connecting rod being operatively connected with the other of said two parts, said fixation means including a cylinder for a pressure-medium and operatively connected with one of the two parts consisting of the vehicle superstructure and one of the said elements of the axle construction, two oppositely acting pistons disposed within said pressure-medium cylinder and provided each with a piston rod having clamping means, abutment means operatively connected with the other of said two last-mentioned parts and adapted to be fixed with said two pistons in the spread-apart positions thereof between said two clamping means.

15. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including prestressed spring means operatively connecting one of the elements of the double axle construction consisting of said axle means, said guide means and said double-armed lever means with said superstructure, and fixation means operatively connected with said prestressed spring means for substantially immobilizing the latter in said center position, said fixation means including a pressure-medium cylinder operatively connected with one of the two parts consisting of said superstructure and of one of said guide members, two oppositely acting pistons within said cylinder, said pistons resting in the center position thereof against fixed abutments in said cylinder, the other of said two last-mentioned parts being provided with abutment surface means interposed between said fixed abutments.

16. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including prestressed spring means operatively connecting one of the elements of the double axle construction consisting of said axle means, said guide means and said double-armed lever means with said superstructure, and fixation means operatively connected with said prestressed spring means for substantially immobilizing the latter in said center position, said prestressed spring means including a cylinder operatively connected with one of the two parts consisting of said superstructure and of one of the said elements of the axle construction, said cylinder being provided with cylinder portions of reduced diameter at both ends thereof, a coil spring within said cylinder supported under prestress against the off-sets formed in said cylinder by means of spring disks, a connecting rod extending through said coil spring and said spring disks and provided with entrainment members on both sides thereof outside of said spring disks, said connecting rod being operatively connected with the other of said two parts, said fixation means including a pressure-medium cylinder operatively connected with one of the two parts consisting of said superstructure and of one of said guide members, two oppositely acting pistons within said cylinder, said pistons resting in the center position thereof against fixed abutments in said cylinder, the other of said two last-mentioned parts being provided with abutment surface means, and roller means to enable said pistons to support themselves at said abutment surface means with said piston in the spread-apart position thereof.

17. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including first means effectively forming a prestressed spring assembly operatively connecting one of the elements of the double axle construction consisting of said axle means, said guide means and said double-armed lever means with said vehicle superstructure and second means effectively forming an immobilization device and operatively connected with said first means to effect the fixation action of said stabilizing means, the spring assembly constituted by said first means serving simultaneously as immobilization device constituted by said second means and including a hydraulic cylinder receiving therein two pistons and provided with a center section, spring force means acting on said pistons, and means effectively providing a hydraulically transferrable fixing force for selectively loading the pistons by said last-mentioned force additionally to the loading by said spring force means.

18. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including first means effectively forming a prestressed spring assembly operatively connecting one of the elements of the double axle construction consisting of said axle means, said guide means and said double-armed lever means with said vehicle superstructure and second means effectively forming an immobilization device and operatively connected with said first means to effect the fixation action of said stabilizing means, the spring assembly constituted by said first means serving simultaneously as immobilization device constituted by said second means and including a hydraulic cylinder receiving therein two pistons and provided with a center section, spring force means acting on said pistons, and means effectively providing a hydraulically transferrable fixing force for selectively loading the pistons by said last-mentioned force additionally to the loading by said spring force means, said cylinder being operatively connected with one of the two parts consisting of said superstructure and of one of said axle means, a piston rod operatively connected with the other of said two parts and provided with two entrainment pistons received, respectively, in the two end sections of said cylinder, the center section of said cylinder having a larger diameter than said end sections, and said spring force means abutting on both sides thereof within said center section on piston-like spring disks constitued by said first-mentioned pistons.

19. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including first means effectively forming a prestressed spring assembly operatively connecting one of the elements of the double axle construction consisting of said axle means, said guide means and said double-armed lever means with said vehicle superstructure and second means effectively forming an immobilization device and operatively connected with said first means to effect the fixation action of said stabilizing means, the spring assembly constituted by said first means serving simultaneously as immobilization device constituted by said second means and including a hydraulic cylinder receiving therein two pistons and provided with a center section, spring force means acting on said pistons, and means effectively providing a hydraulically transferrable fixing force for selectively loading the pistons by said last-mentioned force additionally to the loading by said spring force means, said cylinder being operatively connected with one of the two parts consisting of said superstructure and of one of said axle means, a piston rod operatively connected with the other of said two parts and provided with two entrainment pistons received, respectively, in the two end sections of said cylinder, the center section of said cylinder having a larger diameter than said end sections, and said spring force means abutting on both sides thereof within said center section on piston-like spring disks constituted by said first-mentioned pistons, the center section of said cylinder being filled with a pressure medium and being operatively connected with a further cylinder secured to said superstructure, and a spring-loaded piston within said further cylinder and operable to be loaded by compressed air.

20. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including first means effectively forming a prestressed spring assembly operatively connecting one of the elements of the double axle construction consisting of said axle means, said guide means and said double-armed lever means with said vehicle superstructure and second means effectively forming an immobilization device and operatively connected with said first means to effect the fixation action of said stabilizing means, the spring assembly constituted by said first means serving simultaneously as immobilization device constituted by said second means and including a hydraulic cylinder receiving therein two pistons and provided with a center section, spring force means acting on said pistons, and means effectively providing a hydraulically transferrable fixing force for selectively loading the pistons by said last-mentioned force additionally to the loading by said spring force means, said cylinder being operatively connected with one of the two parts consisting of said superstructure and of one of said axle means, a piston rod operatively connected with the other of said two parts and provided with two entrainment pistons received, respectively, in the two end sections of said cylinder, the center section of said cylinder having a larger diameter than said end sections, and said spring force means abutting on both sides thereof within said center section on piston-like spring disks constituted by said first-mentioned pistons, the center section of said cylinder being filled with a pressure medium and being operatively connected with a further cylinder secured to said superstructure, and a spring-loaded piston within said further cylinder and operable to be loaded by compressed air, and means for supplying compressed air to said further cylinder including manually and automatically controlled valve means.

21. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, and stabilizing means for stabilizing said double axle in the center position thereof including first means effectively forming a prestressed spring assembly operatively connecting one of the elements of the double axle construction consisting of said axle means, said guide means and said double-armed lever means with said vehicle superstructure and second means effectively forming an immobilization device and operatively connected with said first means to effect the fixation action of said stabilizing means, the spring assembly constituted by said first means serving simultaneously as immobilization device constituted by said second means and including a hydraulic cylinder receiving therein two pistons and provided with a center section, spring force means acting on said pistons, and means effectively providing a hydraulically transferrable fixing force for selectively loading the pistons by said last-mentioned force additionally to the loading by said spring force means, the center section of said cylinder being filled with a pressure medium and being operatively connected with a further cylinder secured to said superstructure, and a spring-loaded piston within said further cylinder and operable to be loaded by compressed air.

22. A curve-following double axle construction, especially double rear axle for motor vehicles having a vehicle superstructure, comprising first axle means, second axle means, guide means for guiding said first and second axle means in opposite directions with respect to each other including a pair of guide members for each axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means, guided thereby, means rotatably supporting said double-armed lever means approximately in the center thereof at the vehicle superstructure, and stabilizing means for stabilizing said double axle in the center position thereof including first means operatively connecting one of the elements of the double axle construction consisting of said axle means, said guide means and said double-armed lever means with said vehicle superstructure and second means operatively connected with said first means to effect the fixation action of said stabilizing means.

23. A curve-following double axle, especially double rear axle for motor vehicles provided with a vehicle superstructure and with steering means, comprising first axle means, second axle means, guide means for guiding said first and second axle means in opposite directions with respect to each other including transverse guide means and approximately longitudinally extending guide means for each axle means, a transverse bearer means operatively connected with longitudinally extending guide means of a respective axle means, an essentially horizontally arranged double-armed lever means extending longitudinally of the vehicle, said pairs of guide members extending forwardly of the respective axle means guided thereby, means operatively connecting a respective end of said double-armed lever means to a respective pair of said guide members and therethrough to the corresponding axle means guided thereby, means rotatably supporting said double-armed lever means approximately in the center thereof at the vehicle superstructure, spring means for spring supporting said axle means by said transverse bearer means at said vehicle superstructure, connecting means operatively connecting said double-armed lever means with said steering to positively actuate the former upon actuating the latter, said transverse guide means being disposed at least nearly within the same transverse plane as the respective spring means and axle means, and stabilizing means for substantially stabilizing said double axle construction in the center position thereof.

(References on following page)

References Cited in the file of this patent

UNITED STATES PATENTS

| | | |
|---|---|---|
| 1,938,120 | Spohn | Dec. 5, 1933 |
| 2,502,946 | Hart | Apr. 4, 1950 |
| 2,750,201 | Hagedorn | June 12, 1956 |
| 2,761,693 | Stover | Sept. 4, 1956 |
| 2,812,191 | Kersey et al. | Nov. 5, 1957 |
| 2,854,254 | Quint | Sept. 30, 1958 |
| 2,941,817 | Benson | June 21, 1960 |
| 2,982,563 | Gregg | May 2, 1961 |
| 3,047,306 | Easton | July 31, 1962 |

FOREIGN PATENTS

| | | |
|---|---|---|
| 74,621 | Denmark | Aug. 11, 1952 |
| 923,700 | Germany | Feb. 21, 1955 |
| 1,005,848 | Germany | Apr. 4, 1957 |